United States Patent
Ghanwani et al.

(10) Patent No.: US 9,471,356 B2
(45) Date of Patent: Oct. 18, 2016

(54) SYSTEMS AND METHODS FOR PROVIDING VLAN-INDEPENDENT GATEWAYS IN A NETWORK VIRTUALIZATION OVERLAY IMPLEMENTATION

(71) Applicant: Dell Products L.P., Round Rock, TX (US)

(72) Inventors: Anoop Ghanwani, Rocklin, CA (US); Krishnamurthy Subramanian, Saratoga, CA (US); Sanjay Sane, Fremont, CA (US)

(73) Assignee: DELL PRODUCTS L.P., Round Rock, TX (US)

( * ) Notice: Subject to any disclaimer, the term of this patent is extended or adjusted under 35 U.S.C. 154(b) by 744 days.

(21) Appl. No.: 13/916,341

(22) Filed: Jun. 12, 2013

(65) Prior Publication Data

US 2014/0372582 A1 Dec. 18, 2014

(51) Int. Cl.
G06F 9/455 (2006.01)
H04L 12/715 (2013.01)
H04L 12/741 (2013.01)
H04L 29/08 (2006.01)
H04L 29/12 (2006.01)

(52) U.S. Cl.
CPC ....... *G06F 9/45558* (2013.01); *G06F 9/45533* (2013.01); *H04L 45/64* (2013.01); *H04L 45/745* (2013.01); *H04L 67/1002* (2013.01); *H04L 67/1034* (2013.01); *G06F 2009/45595* (2013.01); *H04L 45/54* (2013.01); *H04L 61/2007* (2013.01)

(58) Field of Classification Search
None
See application file for complete search history.

(56) References Cited

U.S. PATENT DOCUMENTS

| | | | | |
|---|---|---|---|---|
| 2013/0318219 | A1* | 11/2013 | Kancherla | H04L 49/70 709/222 |
| 2014/0075243 | A1* | 3/2014 | Nagaraj | H04L 43/0811 714/32 |
| 2014/0269705 | A1* | 9/2014 | DeCusatis | H04L 45/52 370/390 |
| 2014/0313892 | A1* | 10/2014 | Kamble | H04L 47/2458 370/235 |

OTHER PUBLICATIONS

J. Petit, J. Gross, B. Pfaff, M. Casado, Virtual Switching in an Era of Advanced Edges, Proceededings of the 2nd Workshop on Data Center—Converged and Virtual Ethernet Switching, Sep. 2010, pp. 1-7.*

* cited by examiner

*Primary Examiner* — Christopher Crutchfield
(74) *Attorney, Agent, or Firm* — Haynes & Boone, LLP

(57) ABSTRACT

An information handling system is provided. The information handling system includes a first hypervisor running on a first server and a second hypervisor running on a second server. The first hypervisor manages a first virtual switch and has an overlay forwarding table in memory supporting at least one virtual machine, while the second hypervisor manages a second virtual switch and also has the overlay forwarding table in memory and supports at least one other VM. The information handling system further includes a plurality of gateway devices coupled to the hypervisors. The gateway devices share a floating address and are configured to export a host route, associated with the address, into a corresponding entry in an underlay routing table to redirect network traffic from a first gateway device to a second gateway device.

20 Claims, 5 Drawing Sheets

SYSTEMS AND METHODS FOR PROVIDING VLAN-INDEPENDENT GATEWAYS IN A NETWORK VIRTUALIZATION OVERLAY IMPLEMENTATION

BACKGROUND

1. Technical Field

The present disclosure is related to information handling systems. In particular, embodiments disclosed herein are related to providing gateways for information handling systems implementing overlay networks.

2. Discussion of Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Currently, information handling systems are being developed that seek to leverage underlying hardware to support a wide variety of virtual components to create highly manipulable, configurable virtual networks. One such type of virtualized network is Network Virtualization Over Layer 3 (NVO3). NVO3 provides an overlay network that creates a plurality over Internet Protocol (IP) tunnels that may be used to isolation traffic associated with different customers of a single data center to provide an overlay network that is completely independent from the underlying network devices, or underlay network.

However, currently available implementations have not been entirely satisfactory. For example, while progress has been made in operating the overlay network, communication between hosts and/or servers connected to the overlay network and the external networks such as the Internet are still unsatisfactory. Therefore, there is room for improvement in the provisioning of gateways for overlay networks.

SUMMARY

Consistent with some embodiments, there is provided an information handling system. The information handling system includes a first hypervisor running on a first server, the first hypervisor manages a first virtual switch and supports at least one virtual machine (VM) and a second hypervisor running on a second server, the second hypervisor manages a second virtual switch and supports at least one other VM. The information handling system also includes gateway devices coupled to the first and second hypervisors by an overlay network for which the first and second hypervisors and the gateway devices each provide a network virtualization edge device. The gateway devices share a floating address and are configured to export a host route, associated with the floating address, into a corresponding entry in an underlay routing table in response to a network event to redirect network traffic from a first gateway device of the plurality to a second gateway device.

Consistent with some embodiments, there is provided a method for providing a redundant gateway system to a virtualized overlay network. The method includes a step of providing a floating address for use by a first gateway device and a second gateway device and a step of including the floating address as a default address in an overlay forwarding table present on a plurality of servers running hypervisors with virtual switches. The method further includes steps of including the floating address in a routing information base present in an underlay network and of associating the floating IP address in the routing information base with an underlay IP address of the first gateway device.

Consistent with some embodiments, there is provided an information handling system. The information handling system includes a first hypervisor running on a first server and a second hypervisor running on a second server. The first hypervisor manages a first virtual switch and at least one virtual machine (VM). The first virtual switch has a first overlay forwarding table in a memory associated with the first virtual switch. Similarly, the second hypervisor manages a second virtual switch and at least one other VM. The second virtual switch has a second overlay forwarding table in a memory associated with the second virtual switch. The information handling system further includes a first gateway device and a second gateway device, which are coupled to the first and second servers. And the information handling system includes an overlay network controller that is configured to communicate with the first and second hypervisors over an overlay network. The network controller is also configured to redirect traffic from the first gateway device to the second gateway device when a network event is detected.

These and other embodiments will be described in further detail below with respect to the following figures.

Figure 1:
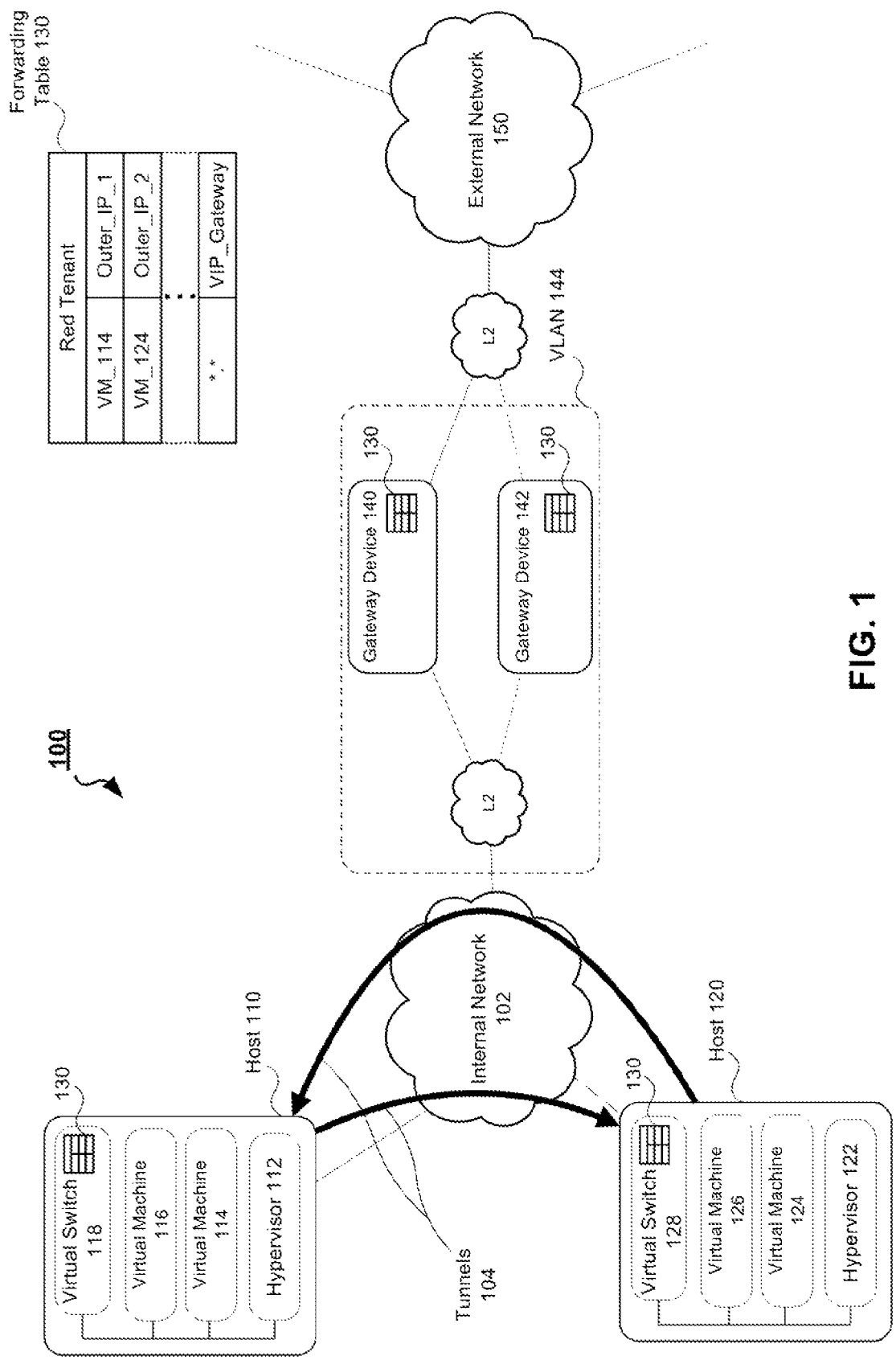
FIG. 1 is a diagram that illustrates an overlay network that includes a number of hypervisors communicating over a physical network with an external network through a plurality of gateway devices.

For clarity of discussion, elements having the same designation in the drawings may have the same or similar functions. The drawings may be better understood by referring to the following Detailed Description.

DETAILED DESCRIPTION

In the following description specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 depicts an information handling system 100 that includes an overlay network running over top of an underlying physical network. The overlay network and the underlying physical network are depicted jointly as an internal network 102. The internal network 102 includes a plurality of networking devices such as routers, switches, and combinations thereof. As depicted, the internal network 102 includes a plurality of routers communicating according to the Internet Protocol (IP). The IP routers of internal network 102 provide a plurality of tunnels that are used to provide communication between a plurality of virtual machines that are configured to communicate over the internal network 102 through a number of tunnels 104. Tunnels 104 may be physically provided by the physical devices of internal network 102 and physical links to servers or hosts 110 and 120. Information handling system 100 may support virtualization technologies such as Virtual Extensible Local Area Network (VXLAN) or Network Virtualization using Generic Routing Encapsulation (NVGRE) in order to provide tunnels such as tunnels 104. These protocols and others have been developed to allow for the decoupling the overlay network from the underlying physical network's design and may be used in routing packets from virtual switch to virtual switch.

Each of hosts 110 and 120 includes one or more processors that execute instructions received over a network interface or stored in a local memory. The processors may also perform operations on data. The processors of hosts 110 and 120 may provide a plurality of functions and/or services. Host 110 has a hypervisor 112 which supports a plurality of virtual machines (VMs). As depicted, hypervisor 112 supports two VMs: virtual machine 114 and virtual machine 116. In order to facilitate communication between VMs 114 and 116 and between VM 114 or VM 116 and another VM on another host, such as host 120, a virtual switch 118 may be running on the host 120. The virtual switch 118 is managed by the hypervisor 110 and provides internal virtualized network capabilities, allowing VMs within a hypervisor to communicate more directly with each other, given that the communicating VMs are part of a single tenant. For example, if VMs 116 and 114 are part of a single tenant, a packet sent from VM 114 with an address corresponding to VM 116 as its destination address may be switched by virtual switch 118. However, where VMs 114 and 116 are not in the same tenant the virtual switch 118 may route the packet to a gateway to facilitate the transmission. Alternatively, in some embodiments the virtual switch 118 may permit the exchanges of packets between VMs even if they are not in the same tenant.

Host 120 shares many of the features discussed above in connection with host 110. Thus, host 120 supports a hypervisor 122, which in turn supports VMs 124 and 126 and manages a virtual switch 128. Both hosts 120 and 110 may include many more VMs than depicted. Additionally, many embodiments of information handling system 100 include many more hosts like hosts 110 and 120. To provide communication between VMs on host 110 and VMs on host 120, the virtual switches 118 and 128 may be configured to encapsulate and decapsulate packets for transmission through the tunnels 104. These tunnels may be IP-based tunnels that function by encapsulation and decapsulation of packets for transmission over the underlying network devices. In general, the functions of encapsulation and decapsulation may be provided by a network virtualization edge (NVE) device, which may be provided by the virtual switches 118 and 128, but may also be provided by physical switches, such as top-of-rack switches. By encapsulating packets from VMs 114, 116, 124, and 126, the packets can be transmitted over the underlying physical devices of internal network 102 according to the requirements of the overlay network provided in internal network 102.

The routing decisions are made according to one or more forwarding tables used by the overlay network. An exemplary forwarding table 130 for a first tenant is depicted in FIG. 1. Embodiments of the forwarding table 130 may use media access control (MAC) addresses and/or IP addresses depending on whether the virtual switches are performing forwarding at Layer 2 (L2) or Layer 3 (L3). When forwarding is performed with a single virtual subnet, forwarding may be performed at Layer 2. When forwarding is performed across more than one virtual subnet, forwarding may be performed at Layer 3. In this example, traffic for any subnets that are not known to the internet network 102 are forwarded to gate device 140 or 142. Forwarding table 130 for the first tenant includes VM_114 (the address of VM 114), VM_124 (the address of VM 124), and a default entry (*,*) to handle routing when a match for a given destination address is not found.

In the forwarding table 130, each of these overlay address entries may be paired in forwarding table 130 with an IP address corresponding to the underlay network. In the table, VM_114 is paired with Outer_IP_1, VM_124 is paired with Outer_IP_2 and the default entry *,* is paired with an IP for a gateway device 140, VIP_Gateway. VIP_Gateway is a virtual IP address, meaning that the IP address may server as an address for more than one physical device. Copies of the forwarding table 130 may be present in memory associated with the virtual switch 118, the virtual switch 128, the gateway device 140, and a second gateway device 142. The copies of the forwarding table may differ in the rows that correspond to devices that are locally reachable. For example, on host 110 the entry corresponding to VM_114 has a local port of virtual switch 118 over which the VM_114 is reachable.

As indicated by forwarding table 130, when either of virtual switches 118 or 128 receives a packet from VMs 114 or 124 that does not have a destination address listed in the forwarding table 130, the packet is sent to the gateway device 140 or 142. Gateway devices 140 and 142 are configured in a virtual local area network (VLAN) 144 in order to provide redundancy. The Layer 3 traffic over internal network 102 is sent to either gateway device 140 or gateway device 142 over a Layer 2 network portion which provides a broadcast domain in underlying physical devices. VLAN 144 is configured to permit traffic having VIP_Gateway as its destination address to be transmitted to gateway device 140 while it is active, and in the event of a failure of gateway device 140, to gateway device 142. In this way gateway devices 140 and 142 provide a level of redundancy in connecting the internal network 102 to an external network 150.

For example, at a first time VM 116 sends a packet having an address associated with the external network 150. The virtual switch 118 receives the packet and looks for a match in its forwarding table 130. When no match is found, the packet is sent to the device having VIP_Gateway as its address. At the first time, the device having the VIP_Gateway address is gateway device 140. Gateway device 140 receives the packet as a member of VLAN 144, and sends the packet on to the external network 150. After the first time, an adverse network event occurs. This adverse network event may be a failure of the gateway device 140, due to the failure of the device itself or of a physical link connecting thereto. The failure of the gateway device 140 is communicated within VLAN 144, such that the VLAN 144 redirects traffic to the gateway device 142. The failure may be communicated by the gateway device 142 detecting that gateway device 140 is no longer reachable on VLAN 144. In response, the gateway device 140 takes ownership of the VIP_Gateway address and sends out a gratuitous address resolution protocol (ARP) packet through VLAN 144 to indicate its ownership of the address. After the network failure, a similarly addressed packet sent by VM 116 is sent to the external network 150 through the gateway device 142, rather than the gateway device 140.

Due to the use of the VLAN to provide a mechanism by which to redirect traffic away from a failed gateway device to a back-up or redundant gateway device, information handling system 100 requires significant cooperation between the overlay network and the underlying network devices. For example, the overlay network of internal network 102 requires the deployment of the Layer 2 domain of VLAN 144 in the underlay network.

Figure 2:
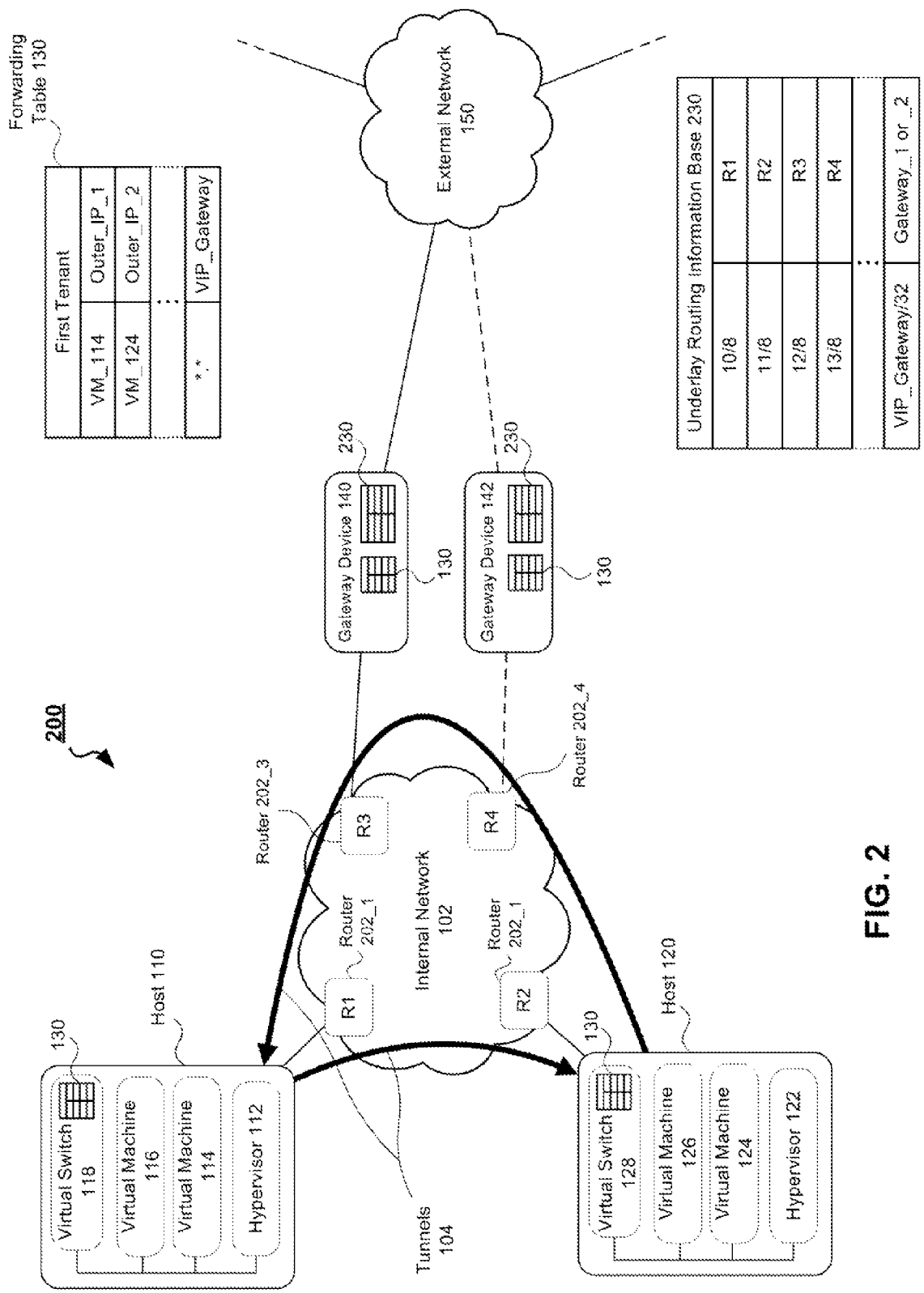
FIG. 2 is a diagram that illustrates an overlay network that includes a number of hypervisors communicating over a physical network with an external network through a plurality of gateway devices according to some embodiments.

FIG. 2 is an illustration of an information handling system 200 that, unlike information handling system 100 of FIG. 1, does not rely on a VLAN to provide a redundant gateway device system. While information handling systems 200 and 100 are different in this regard, the two systems share many features. For example, information handling system 200 is depicted as having two hosts 110 and 120. In some embodiments of information handling system 200, many more hosts are present. Each of hosts 110 and 120 support a hypervisor, a plurality of VMs, and a virtual switch. Some embodiments of hosts 110 and 120 include more than two VMs.

The hosts are coupled to the internal network 102, which has an overlay network running thereon. The overlay network provides a plurality of tunnels 104 that permit the VMs of a tenant to communicate with each other. Each of virtual switches 118 and 128 has a forwarding table 130 in associated memory. As depicted, forwarding table 130 is associated with a first tenant, but other embodiments of information handling system 200 may include a plurality of tenants, which each tenant having an associated forwarding table accessible to the virtual switches to facilitate the separate, isolated operation of multiple tenants in the system. The forwarding table 130 for the first tenant maps internal, overlay network addresses, such as internal, overlay IP addresses, to external IP addresses as depicted in FIG. 2.

Specific network devices from the physical network devices underlying the internal network 102 are depicted in FIG. 2. Four such devices are depicted, including routers 202A, 202B, 202C, and 202D. Also included in FIG. 2 is an underlay routing information base (RIB) 230 that is used by the underlying network devices of internal network 102. As depicted, when a packet is received having an IP address falling under a prefix, it is directed by the underlay routing information base 230 to the appropriate router. For instance, the RIB 230 associates the IP addresses matching the 10/8 prefix with router 202A by associating 10/8 addresses with an IP address of router 202A, R_1, in the RIB 230. Thus, when a packet is received in the underlay network with a destination address of 10/8, the packet is forwarded to router 202A. Similar handling occurs to send packets with an 11/8 prefix to router 202B, 12/8 to router 202C, and 13/8 to router 202D. Many more prefixes and corresponding routing addresses may be included in embodiments of the underlay RIB 230.

As discussed above, the forwarding table 130 present on virtual switches 118 and 128 and gateway devices 140 and 142 includes a floating address, VIP_Gateway, which can be used to identify either gateway device 140 or gateway device 142. In some embodiments, VIP_Gateway is a floating IP address. Gateways 140 and 142 are configured to inject the VIP_Gateway address into the underlay RIB 230. In the underlay RIB the VIP_Gateway address is a full /32 host route. Regardless of whether the particular VIP_Gateway address matches a given prefix, the full /32 address is used in the RIB 230.

The gateway devices 140 and 142 are both configured to communicate with the underlying network devices of internal network 102. This may be done by communicating with the underlying network devices according to the protocol used by the underlying network devices. As a specific example, the gateway devices 140 and 142 may communicate with the underlying network of internal network 102 by a link-state routing protocol, such as the Open Shortest Path First (OSPF) protocol. Other embodiments of gateway devices 140 and 142 may communicate with the underlying network using the Border Gateway Protocol (BGP), or another protocol.

As depicted in information handling system 200, there are two gateway devices, but some embodiments may include more. Gateway devices 140 and 142 are able to communicate by a liveness protocol. The liveness protocol allows the gateway devices 140 and 142 to each be aware of the status of the others as operational or not. Accordingly, if gateway device 140 fails, gateway device 142 becomes quickly aware of the failure. Gateway devices 140, 142, and any others present in an embodiment, also conduct an election to select one gateway device as the default gateway device and the other or others as redundant devices. Multiple gateways may be active at any given time as long as there is a mechanism to ensure that, for a given flow, only one gateway is active. Thus, it may be possible to have flow-base load sharing across multiple active gateways. As discussed above, the gateway devices 140 and 142, when active, may be configured to inject an entry into the underlay RIB 230 and are thus both shown as including a copy of underlay RIB 230. Gateway devices 140 and 142 may not actually include a copy of the RIB 230. Additionally, the liveness protocol may be unicast or multicast. If unicast is used, the network devices of the underlay network may support only unicast, and the addresses of each of the gateways may be configured in all of the gateways.

In a particular example, gateway device 140 may be elected as the default device. Accordingly, the gateway device 140 injects an entry into the RIB 230 that associates the floating VIP_Gateway host route with the IP address of the gateway device 140, Gateway_1. In the event that gateway device 140 fails, the liveness protocol alerts the remaining gateway devices. As depicted, with only gateway 140 and gateway 142, gateway device 142 becomes aware of the failure of the default gateway. Gateway device 142 then injects an entry into the underlay RIB 230, overwriting the entry injected by gateway device 140. The entry injected by gateway device 142 associates the floating VIP_Gateway address with Gateway_2, the underlay IP address of gateway device 142. Thereafter, the RIB 230 directs packets to the still-functioning gateway device 142, rather than to the failed gateway device 140.

Information handling system 200 may thus be able to divert traffic between gateway devices during a failover event to provide a high availability (HA) scheme. Information handling system 200 does not rely on Layer 2 networks and VLANs running thereon to provide for the redirection of traffic from a failed gateway device. Rather, information handling system 200 includes gateway devices that are configured to communicate directly with the RIB 230 of the underlay network devices to manipulate traffic away from a failed gateway device to a redundant gateway device. Information handling system 200 may provide fast convergence in the event of a failover.

Because information handling system 200 does not rely on a VLAN like information handling system 100 to provide gateway device redundancy, information handling system 200 may avoid some of the limitations that a VLAN may impose. For instance, having gateway devices 140 and 142 in a VLAN may impose topographical restraints on the placement of the gateway devices. Typically, a VLAN is limited to a single floor of a building or a single container of pod. The gateway devices of information handling system 200 may be positioned largely independently of each other. For example, gateway device 140 may be in a different container than gateway device 142. Such a feature may allow gateway devices to be located closer to the compute nodes of a given tenant.

The gateway devices 140 and 142 may both have an operating system running thereon, such as the FORCE10 OPERATING SYSTEM (FTOS) provided by Dell, Inc. of Round Rock, Tex. FTOS or another operating system may be configured to expose an application programming interface (API) that facilitates the handling of the floating IP address, VIP_Gateway, as it is associated with a new gateway device in a failover event. In embodiments using FTOS, SMARTSCRIPTS™, a Perl/PHP-based programmatic API, may be used to provide integration between server-based gateway devices 140 and 142 and routing protocols presenting the underlying network devices. The API exposed by the operating system or firmware may provide a mechanism to update a current owner gateway device of the floating IP address. The back-end of the API instantiates a full /32 host route and distributes it via the routing protocol into the underlay RIB 230. The API may be further used to indicate which gateway device is that active gateway device among a plurality of gateway devices present in information handling system 200.

Figure 3:
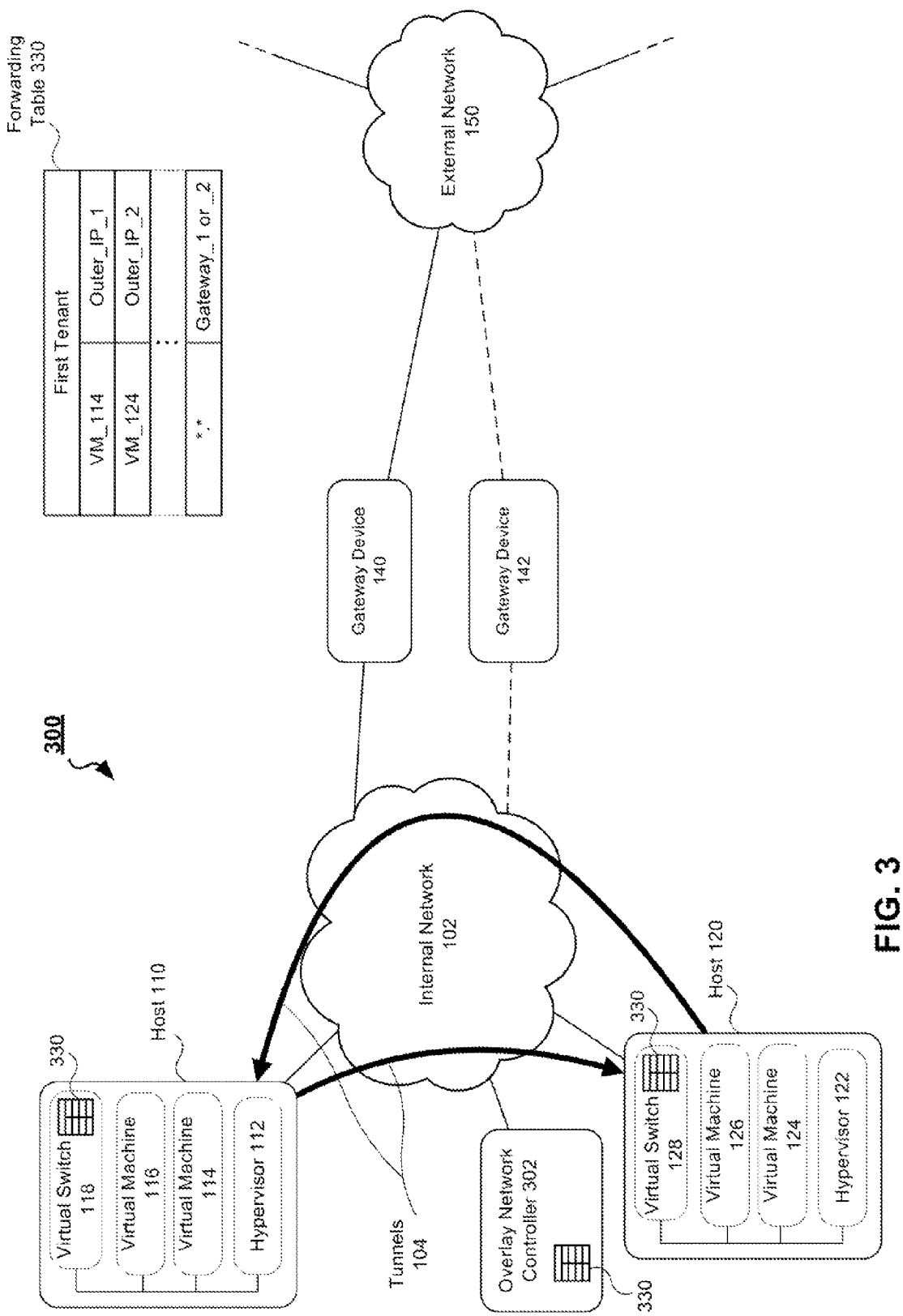
FIG. 3 is a diagram that illustrates an overlay network that includes a number of hypervisors communicating over a physical network with an external network through a plurality of gateway devices according to some embodiments.

FIG. 3 is an illustration of an information handling system 300, which is similar in some respects to the information handling system 200 of FIG. 2. Information handling system 300 includes hosts 110 and 120, each having a plurality of VMs managed by a hypervisor that also manages a virtual switch. The hosts 110 and 120 are both coupled to an internal network 102 which includes a plurality of underlying network devices over which an overlay network is implemented. The overlay network of internal network 102 provides a number of tunnels 104 by which VMs in the same tenant, but on different hosts, may communicate. Included in FIG. 3 is an overlay network controller 302 depicted as coupled to the internal network 102. The overlay network controller 302 may be a software program running on a host or server and may be used to control and/or manage the hosts 110 and 120 and the systems running thereon, including hypervisors, VMs, and/or virtual switches. Overlay network controller 302 may also be configured to gather data on the underlying network devices of internal network 102, including the gateway devices 140 and 142. Network orchestrators such as VMWARE® VCENTER™ Server or VCLOUD™ DIRECTOR, MICROSOFT® SYSTEM CENTER VIRTUAL MACHINE MANAGER™ (SCVMM), or another suitable orchestration platform may be used as overlay network controller 302.

As depicted, the overlay network controller 302 includes a copy of a forwarding table 330 in associated memory. In many respects, the forwarding table 330 is similar to the forwarding table 130 described in relation to both information handling system 100 and information handling system 200. However, the overlay network controller 302 may be configured to manipulate the forwarding table 330 in many ways and distribute the resulting changes throughout the overlay network. Thus, the overlay network controller 302 may make changes in the forwarding table 330 that are then propagated to each host and associated hypervisor in information handling system 300. This may be used to provide for the redirection of traffic away from a failed gateway device to a back-up gateway device.

For example, the overlay network controller 302 may detect the failure of the gateway device 140. In response, the overlay network may propagate a change in the forward tables 330 present on hosts like host 110 and 120 and elsewhere in the internal network 102. Before the failure of gateway device 140 an unrecognized destination address within the first tenant is associated with the IP address of the gateway device 140, which has Gateway_1 as its IP address. In response to the failure of the gateway device 142, the overlay network controller 302 propagates an update to the existing forwarding tables 330 such that an unrecognized destination address is thereafter associated with the gateway device 142, which has Gateway_2 as its IP address.

By propagating the change to all copies of the first tenant forwarding table 330, traffic is redirected away from a failed gateway device to an operational one. Because the gateway devices may be managed using L3 communication, the gateway devices may be physically positioned within the information handling system in different locations. For example, gateway device 142 may be on a first floor of a building, while gateway device 140 is on another floor of the building. Where at least portions of the information handling system are configured within modular containers, gateway device 140 may be in a first container while gateway device 142 is in a second container.

Figure 4:
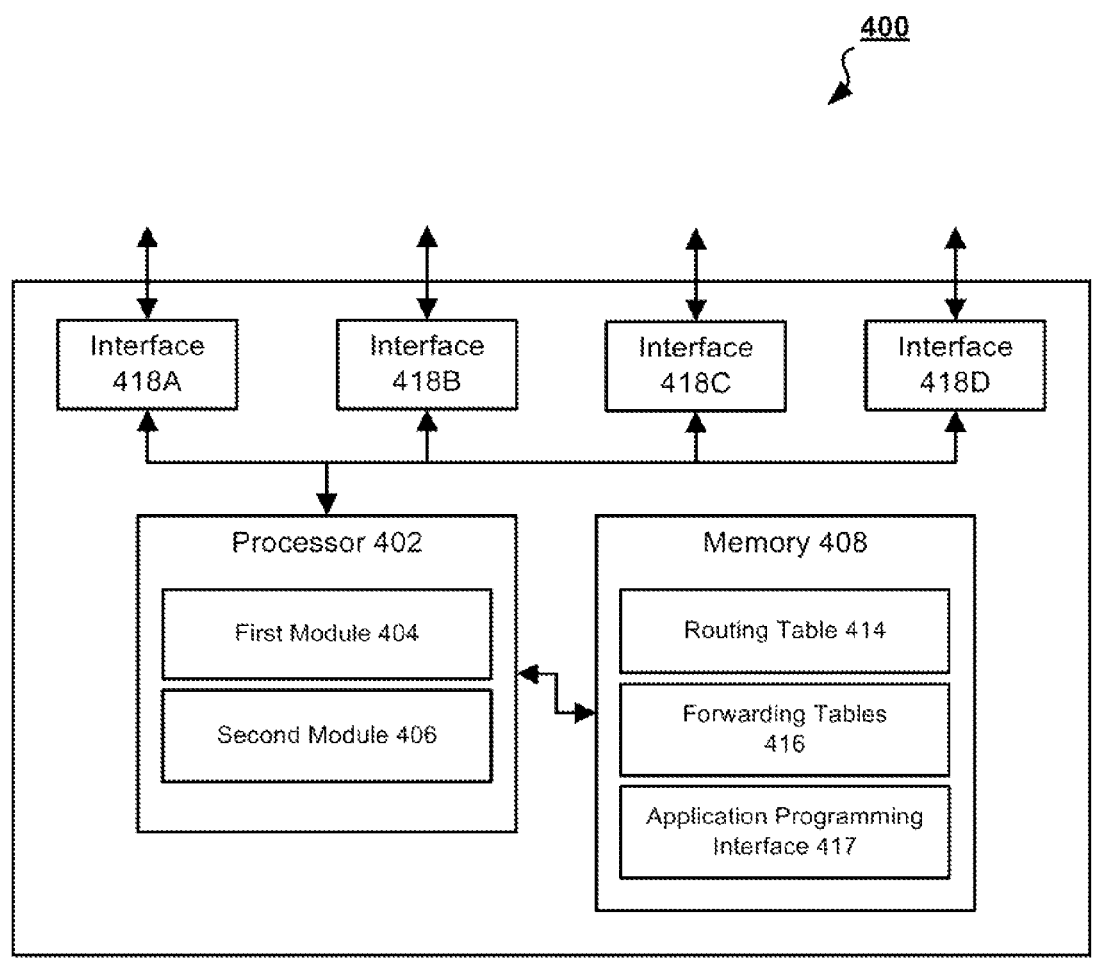
FIG. 4 is a functional diagram of an information handling device such as may be used in an information handling system.

FIG. 4 is a functional diagram of a computing device 400 such as may be used to provide some of the features of information handling systems 100, 200, and 300. Computing device 400 includes a processor 402 that provides a number of modules including a first module 404 and a second module 406. In some embodiments, processor 402 may include one or more processors, which may include general purpose central processing units and/or network processing units. First and second modules 404 and 406 may include a packet inspection module allowing incoming packets to be inspected, an encapsulation module for encapsulating and decapsulating packets for tunneled transmission, a multicast replication module, and/or other modules. The modules of processor 402 may be provided by software stored in a memory 408 that when executed by the processor 402 causes the processor to function as each module. One or more of the modules may also be provided as an application specific integrated circuit (ASIC).

As depicted, memory 408 may be a solid-state memory device or a hard disk drive and is depicted as storing a routing table 414 and one or more forwarding tables 416. Each of the forwarding tables 416 may be associated with a different tenant being supported by the computing device 400. Some embodiments of the computing device 400 may not include both the routing table 414 and forwarding tables 416. Thus, the computing device 400 may be configured in many different ways.

In addition to the processor 402 and the memory 408, the computing device 400 includes a plurality of interfaces 418A, 418B, 418C, and 418D. The interfaces 418A-D provide connectivity to the computing device 400, such that it may send and receive packets as a switch or a router. Both the hosts 110 and 120, as well as the routers and gateway devices of FIGS. 1, 2, and 3 may be provided by embodiments of the computing device 400.

Figure 5:
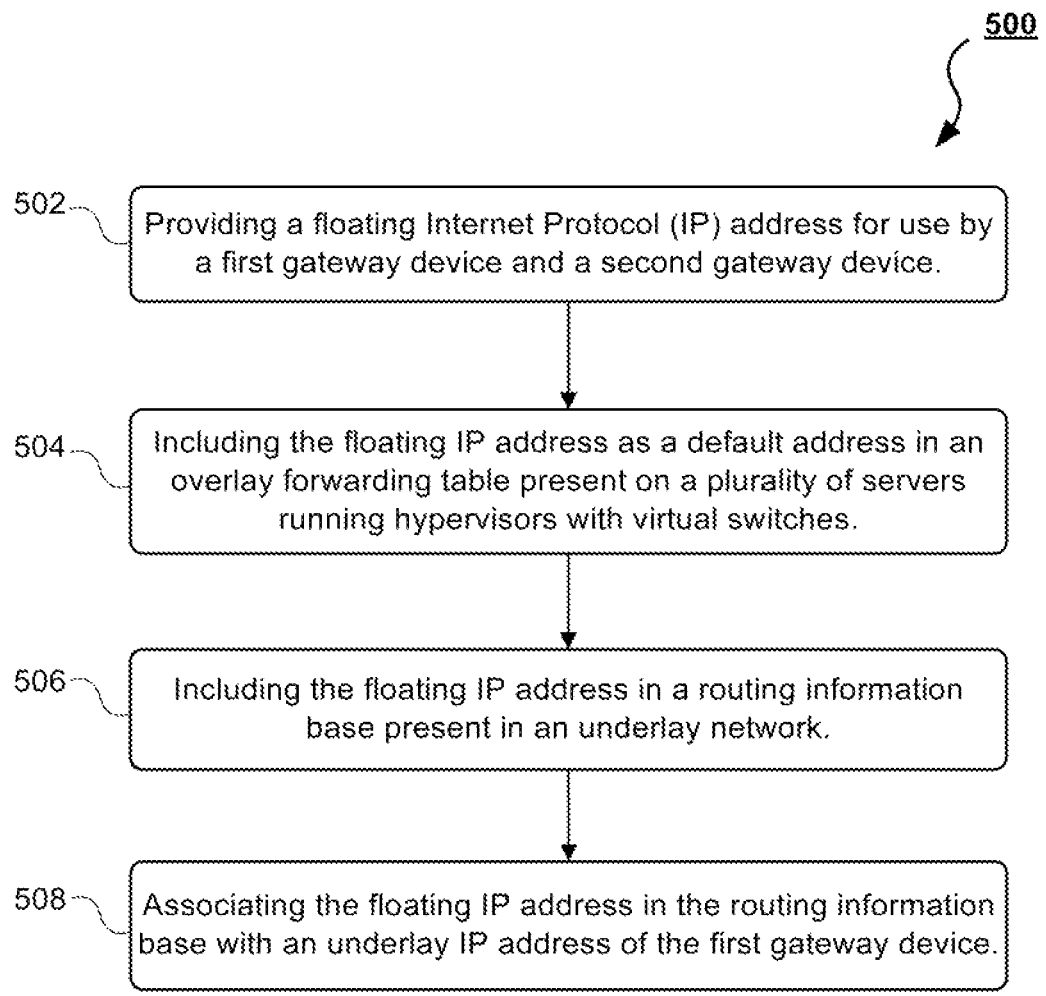
FIG. 5 is a flowchart of a method for providing a gateway to a virtualized overlay network using Layer 3 routing.

FIG. 5 includes a method 500 for providing a gateway to a virtualized overlay network using Layer 3 routing. Method 500 is depicted in FIG. 5 as include a number of enumerated steps. However, embodiments of method 500 may include additional steps before, in between, and after these enumerated steps. As depicted, method 500 begins in step 502 in which a floating IP address is provided for use by a first gateway device and a second gateway device. The floating IP address may be provided by an overlay network controller. In step 504, the floating IP address is included as a default address in one or more forwarding tables present on a plurality of servers running hypervisors managing virtual switches. In step 506, the floating IP address is including in a routing information base present in an underlay network. This may be done by injecting an entry containing the floating IP address into the routing information base. In step 508, the floating IP address in the routing information base is associated with an underlay IP address of the first gateway device, such that the floating IP address "points to" the first gateway device.

As discussed above, some embodiments of the method 500 include additional steps. For example, in some embodiments there may be a step in which an adverse network event is detected, the adverse network event being associated with the first gateway device. The adverse network event may be failure of the first gateway device or a failure of one or more links connecting to the first gateway device such that the device is no longer accessible. In such a situation, the method 500 may include steps of associating the floating IP address with the second gateway device in the overlay forwarding table, and associating the floating IP address in the routing information base with an underlay IP address of the second gateway.

The first and second gateway devices described above are configured to communicate with the underlying network devices according to a protocol used by those network devices. For example, the protocol may be BGP or may be a link-state protocol, like the OSPF protocol. The floating IP address may be associated in an entry of the routing information base by communicating according to such a protocol.

As discussed above, the first and second gateway devices may be server-based gateway devices that have an operating system running thereon that exposes an API. The API may be used to add the floating IP address to the routing information base in the underlying network devices.

Some embodiments of information handling systems as disclosed herein include non-transient, tangible, machine-readable media that includes executable code that when run by a processor, such as a computer processor of on one of hosts 102, 112, or 122 or switches 204, 214, or 224, may cause the processor to perform the steps of method 600 or 700 as described above. Some common forms of machine-readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read. The machine-readable media may be memory on one of hosts 102, 112, or 122 or switches 204, 214, or 224.

The examples provided above are exemplary only and are not intended to be limiting. One skilled in the art may readily devise other systems consistent with the disclosed embodiments which are intended to be within the scope of this disclosure. As such, the application is limited only by the following claims.

What is claimed is:

1. An information handling system comprising:
   a first hypervisor running on a first server, the first hypervisor managing a first virtual switch and supporting at least one virtual machine (VM);
   a second hypervisor running on a second server, the second hypervisor managing a second virtual switch and supporting at least one other VM; and
   gateway devices coupled to the first and second hypervisors by an overlay network for which the first and second hypervisors and the gateway devices each provide a network virtualization edge device, the gateway devices sharing a floating address and configured to export a host route, associated with the floating address, into a corresponding entry in an underlay routing table in response to a network event to redirect network traffic from a first gateway device of the gateway devices to a second gateway device.

2. The information handling system of claim 1, wherein at least one of the gateway devices is active at a given time and the floating address is associated with the active gateway device during that time.

3. The information handling system of claim 1, wherein the floating address comprises an Internet Protocol address and the overlay network comprises a network virtualization over Layer 3 implementation.

4. The information handling system of claim 1, wherein each of the gateway devices is configured to communicate with an underlay network according to a routing protocol in operation in the underlay network.

5. The information handling system of claim 4, wherein the routing protocol comprises a link-state routing protocol.

6. The information handling system of claim 1, wherein the first gateway device and the second gateway device are located in different topological units.

7. The information handling system of claim 1, wherein the first gateway device and the second gateway device are in different containers.

8. The information handling system of claim 1, wherein the gateway devices are server-based gateway devices running an operating system that exposes an application programming interface (API) that is configured to provide an interface for selecting one of the gateway devices as a default gateway device.

9. A method for providing a gateway to a virtualized overlay network using Layer 3 routing, the method comprising:
providing a floating address for use by a first gateway device and a second gateway device;
including the floating address as a default address in an overlay forwarding table present on a plurality of servers running hypervisors with virtual switches;
including the floating address in a routing information base present in an underlay network; and
associating the floating address in the routing information base with an underlay Internet Protocol (IP) address of the first gateway device.

10. The method of claim 9, further comprising:
detecting an adverse network event associated with the first gateway device;
associating the floating address with the second gateway device in the overlay forwarding table; and
associating the floating address in the routing information base with an underlay IP address of the second gateway device.

11. The method of claim 9, wherein the first and second gateway devices are configured to communicate with a plurality of underlay network devices according to a protocol used by the plurality of underlay network devices.

12. The method of claim 11, wherein the protocol used by the underlay network devices is a border gateway protocol (BGP).

13. The method of claim 9, wherein associating the floating address in the routing information base comprises communicating in a protocol used by a plurality of underlay network devices.

14. The method of claim 13, wherein the protocol is a link-state routing protocol.

15. The method of claim 9, wherein the first and second gateway devices are server-based gateway devices running an operating system that exposes an application programming interface (API).

16. The method of claim 15, wherein software running on the server-based gateway devices uses the API to add the floating address in the routing information base with the underlay IP address of the first gateway device or the second gateway device.

17. An information handling system comprising:
a first hypervisor running on a first server, the first hypervisor managing a first virtual switch and at least one virtual machine (VM), the first virtual switch having a first overlay forwarding table in a memory associated with the first virtual switch;
a second hypervisor running on a second server, the second hypervisor managing a second virtual switch and at least one other VM, the second virtual switch having a second overlay forwarding table in a memory associated with the second virtual switch;
a first gateway device and a second gateway device, the first and second gateway devices being coupled to the first and second servers; and
an overlay network controller, the overlay network controller configured to communicate with the first and second hypervisors over an overlay network, and configured to redirect traffic from the first gateway device to the second gateway device when a network event is detected.

18. The information handling system of claim 17, wherein the network event comprises a failure of the first gateway device.

19. The information handling system of claim 17, wherein the first and second overlay forwarding tables direct traffic to the first gateway device before the network event, and the overlay network controller updates the first and second overlay forwarding tables to point to a second gateway device when the network event is detected.

20. The information handling system of claim 17, further comprising a third gateway device, and wherein, when the network event is detected, an election between the third gateway device and the second gateway device determines that traffic is to be redirected from the first gateway device to the second gateway device rather than to the third gateway device.

* * * * *